(12) United States Patent
Mandalia

(10) Patent No.: US 6,721,403 B1
(45) Date of Patent: Apr. 13, 2004

(54) GLOBAL DELIVERY OF RADIO BROADCASTS VIA PUBLIC TELEPHONE NETWORKS

(75) Inventor: Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 09/587,586

(22) Filed: Jun. 2, 2000

(51) Int. Cl.[7] .............................................. H04M 11/00
(52) U.S. Cl. ................ 379/101.01; 455/554; 379/88.17
(58) Field of Search ..................... 379/100.01; 455/414, 455/418, 424, 557, 566, 554

(56) References Cited

U.S. PATENT DOCUMENTS

| | | | | |
|---|---|---|---|---|
| 5,852,610 A | * | 12/1998 | Olaniyan | 370/486 |
| 5,892,536 A | * | 4/1999 | Logan et al. | 725/34 |
| 5,940,391 A | | 8/1999 | Malkin et al. | 370/390 |
| 6,014,569 A | * | 1/2000 | Bottum | 455/466 |
| 6,028,917 A | * | 2/2000 | Creamer et al. | 379/100.01 |
| 6,300,863 B1 | * | 10/2001 | Cotichini et al. | 340/5.8 |

* cited by examiner

*Primary Examiner*—Ahmad F. Matar
*Assistant Examiner*—Quynh H. Nguyen
(74) *Attorney, Agent, or Firm*—Robert Lieber

(57) ABSTRACT

In accordance with the invention, the public switched telephone network (PSTN) is provided with a system for enabling radio broadcast service providers operating over public data networks like the Internet to reach customers of the PSTN through ordinary telephone instruments. Subject to contractual understandings, between Internet-based distributors of radio programs originating as conventional radio broadcasts and telephone service providers in the PSTN, radio programs are distributed to PSTN customers subscribing to a new PSTN-based radio program distribution service. Using station identifying information provided by a PSTN user, calling a special telephone number while using a conventional telephone instrument, an intelligent network in the PSTN inter-acts with an Internet-based radio program distributor to link to a radio broadcast originating at the identified station. The radio broadcast is then transmitted to the PSTN caller in a form suited for reception at the caller's telephone. The broadcast sent to the user can be either a radio program instantly being broadcast by the identified station at the time of the call or a recording of a broadcast carried earlier.

10 Claims, 3 Drawing Sheets

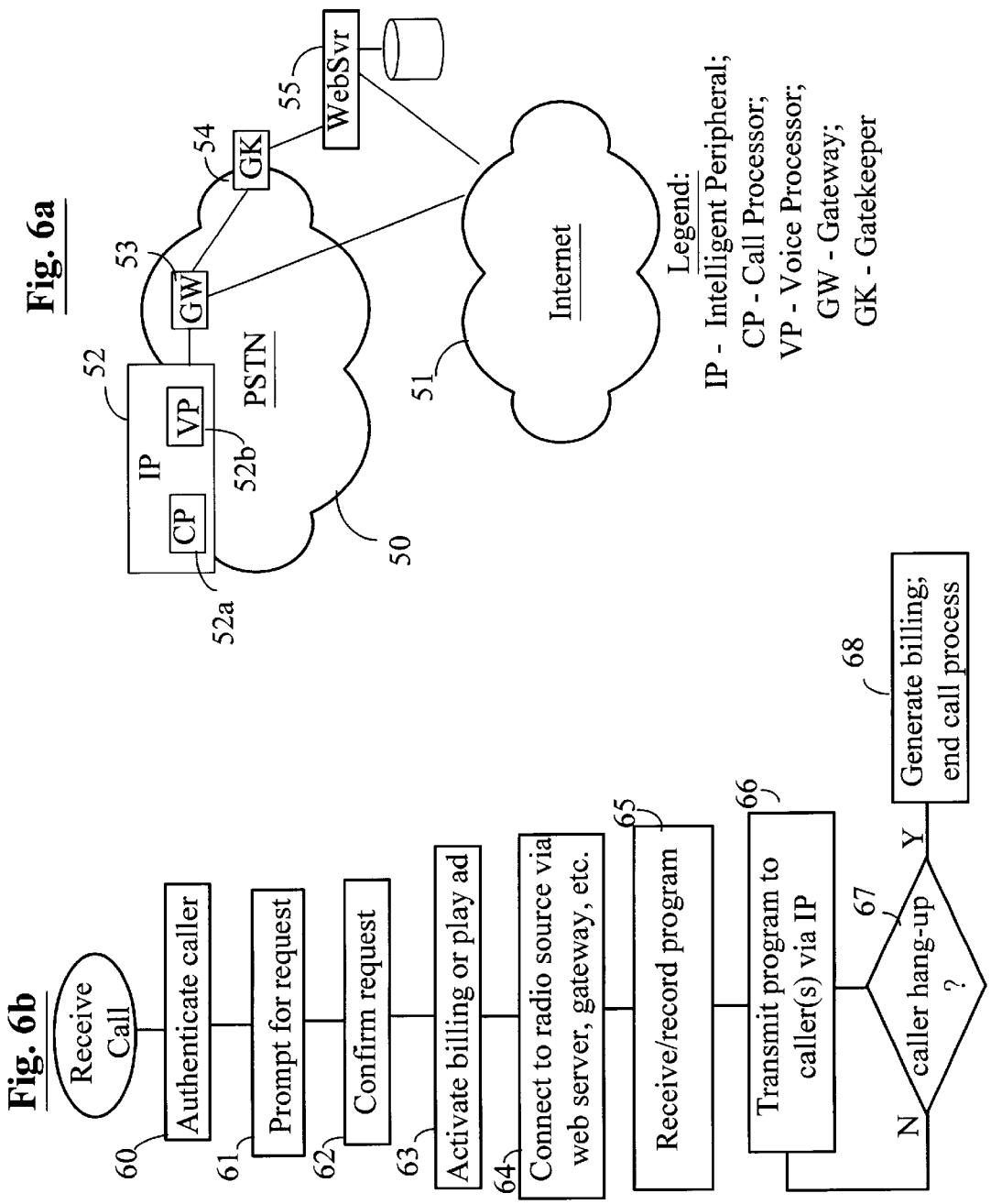

GLOBAL DELIVERY OF RADIO BROADCASTS VIA PUBLIC TELEPHONE NETWORKS

CROSS-REFERENCE TO RELATED APPLICATION

U.S. patent application Ser. No. 08/792,018 to Acker et al, filed Feb. 3, 1997—entitled Multiservice Platform Architecture for Telephone Networks, and assigned to the International Business Machines Corporation—discloses a data processing system for use in intelligent network management resources of the Public Switched Telephone Network (PSTN). A system of this type is useful for efficient implementation of the present invention. The disclosure of that application is incorporated into the present application by this reference.

Briefly summarized, Acker et al discloses a specific intelligent peripheral (IP) network, for use in the public switched telephone network (PSTN). This network, which conforms to advanced intelligent network (AIN) specifications of the PSTN, comprises multiple sets of data processing units having different functional responsibilities relative to other resources of the PSTN (switch centers, concentrators, long distance links, etc.). One set of processing units designated VP's (Voice Processors) manages service applications such as call forwarding, caller ID, etc. Another set, designated CP's (Call Processors) manages customer billing and other processes ancillary to such services. With such functional specialization, new units can be added to each set, and additional responsibilities can be assigned to the new units, without disrupting telephone calls currently connected or processes for creating such connections.

U.S. Pat. No. 5,940,391 to Malkin et al—entitled Method and Apparatus For Reconfigurable and Adaptive Stream Multicast, and assigned to the International Business Machines Corporation—discloses a system for adapting networks such as the Internet to broadcast a stream of multimedia data to multiple destinations. This type of system could be useful for efficient implementation of the present invention.

U.S. Pat. No. 6,028,917 to Creamer et al (assigned to the present assignee), entitled "Extended Telephone Access Via the Internet" discloses a system for streaming data representing real time audio, in a compressed form, through the Internet and PSTN. Techniques disclosed in this patent could be applied to streaming specific radio audio functions pertinent to the present invention.

BACKGROUND OF THE INVENTION

Presently known techniques are used to distribute broadcast radio programs through public data networks such as the Internet/World Wide Web (WWW) to users of such networks. These services are useful, for example, to provide immigrants to a country with news and entertainment broadcasts originating in their native lands and using their native languages.

However, since such distribution generally requires end-users to have digital computers and access to the Internet, it can not be applied to a large population of potential customers who either have only basic telephones or lack access to the Internet.

SUMMARY OF THE INVENTION

The present invention concerns a method of enabling radio broadcast distributors, operating through public data networks like the Internet, to reach an extended audience of customers in a manner that could significantly increase their revenues.

In accordance with this invention, such radio broadcast distributors operating through the Internet (or WWW) are linked via the public switched telephone network (PSTN) to end users of the latter network employing simple telephone instruments. The Internet distributors are linked contractually and communicatively with intelligent network apparatus in the PSTN; that network apparatus preferably configured in the manner taught by Acker et al as summarized above. These links allow PSTN users subscribing to the service to receive remote origin radio broadcasts through telephone devices, including standard telephones with landline connections to PSTN exchanges and cellular instruments.

In this extended radio distribution service, signals representing audio functions extracted from radio broadcasts originating anywhere in the world are conveyed through the Internet and PSTN to end users of the latter network, without requiring those users to have formal access to the Internet. A user of this service dials a specific telephone number; e.g. a special 800 or 900 number associated with the service, and intelligent apparatus in the PSTN operates to establish a connection between an Internet radio broadcast provider and the caller. Signals sent over the connection are converted between forms required by the Internet, the PSTN and the caller's telephone instrument; whereby the signals appear at the caller's instrument in an intelligible audio form.

Calls to the 800 number would be charged entirely to the callers. Calls to the 900 number could be supported either entirely or partially by fees charged to commercial advertisers. For calls to the 900 number, commercial advertisements would be inserted prior to delivery of radio program content. Revenues collected by PSTN carriers could be shared with Internet broadcast service providers where appropriate.

Radio programs delivered through the present service can be either real time broadcasts or pre-recorded content of such. For real-time broadcasts, the caller would have to identify the radio station source. For pre-recorded programs, the caller would have to identify both the station source and the program desired.

The present radio program delivery service would be useful, for instance, to enable a caller in the United States to listen to a foreign language radio newscast originating in a remote part of the world and normally broadcast over a limited geographic area that could not encompass the caller's immediate location.

Application of the multicasting teachings of the above-referenced Malkin et al patent in PSTN intelligence providing the present service would enable that intelligence to distribute a radio program concurrently to multiple end users of the PSTN.

Revenues pertaining to this service could be derived either directly from fees charged to end users, advertisements presented in advance of the signal stream derived from radio broadcast content, or both.

These and other features, advantages and benefits of the invention will be more fully understood from the following description.

BRIEF DESCRIPTION OF THE DRAWINGS

FIG. 6a is a block diagram for explaining how the PSTN is configured and linked to the Internet for providing the services suggested in FIG. 5.

FIG. 6b is a flowchart associated with FIG. 6a, for explaining details of operations suggested only generally in FIG. 5.

DETAILED DESCRIPTION

1. Problem Addressed by the Invention

Figure 1:
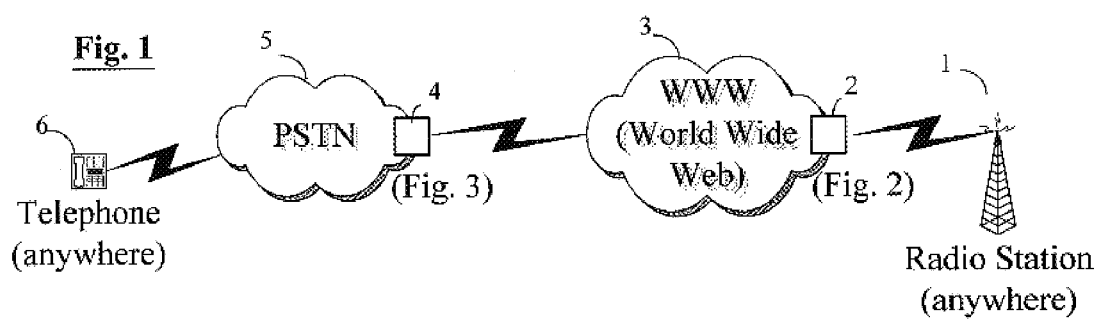
FIG. 1 is a schematic broadly illustrating how the present invention operates.

Although Internet services available presently allow for distribution of broadcast radio signals to Internet users, the user market for that type of service is limited to users having access to the Internet and equipment suited to such access. Furthermore, although users of the Internet may be willing to pay a basic subscription fee to an Internet Access Provider (IAP), many would be reluctant to pay additional fees to receive remotely originating radio broadcasts through such access, even if such broadcasts are too remote to be receivable by standard radio sets at the users' locations.

Recognized by the present invention is the fact that the market for delivery of such radio broadcast distribution services could be substantially expanded, and revenues available to providers of such services could be significantly increased, if the service could be efficiently extended to users of conventional telephones who do not have general access to the Internet.

2. Solution Presently Contemplated

A key term in the last sentence is "efficiently". If the service can not be extended efficiently in the PSTN, it can not be offered to users of that network at a reasonable cost. In order to be extended efficiently the service must be subject to installation in the PSTN without disrupting or delaying existing PSTN processes. This is where the Acker et al system comes into play.

By installing capability to deliver this extended service into an Intelligent Peripheral (IP) network configured in accordance with the disclosure in the Acker et al patent, the service can be installed and activated without disturbing any processes instantly being performed in either the IP network or any of its links to other parts of the PSTN.

Furthermore, in order for the service to be delivered effectively, it must be able to handle concurrent requests from multiple users for the same radio program. That is where the teachings of the above-referenced Malkin et al patent, pertaining to network multicasting of data, would be applicable.

Accordingly, the solution contemplated here is to adapt the PSTN to: 1) link to enterprises using the Internet which provide radio program distribution services relative to a large number of broadcast radio stations throughout the world; 2) distribute radio signals obtained from these enterprises to PSTN users in a form receivable at conventional telephones; 3) use existing intelligent networks, like the network disclosed in the referenced Acker et al application, to allow for seamless and efficient installation of the service into the PSTN with minimal disruption and delay of existing PSTN processes; 4) allow for insertion of advertisements into broadcasts by arrangements between advertisement sponsors and PSTN carriers; 5) allow for multicasting of a single radio program to multiple PSTN users placing concurrent requests for such; and 6) provide a PSTN-based billing process enabling the PSTN to derive revenues from this service by billing either users of the service, sponsors of advertisements or both.

In accordance with a preferred embodiment thereof, the invention is realized by adapting an Intelligent Peripheral (IP) network, of the type disclosed by Acker et al, to provide the contemplated radio service and execute any recording and billing processes associated with it. The IP network consists of sets of data processing units, connected in a local area network (LAN), and having different functional responsibilities. One set manages delivery of service applications (e.g. call forwarding, call waiting, caller ID, voice mail, pre-recorded voice announcements, etc.), and another set manages call processes (call routing, billing, etc.). The IP network represents part of a larger intelligent network conforming to AIN (Advanced Intelligent Network) architecture specifications of the PSTN, and connects to other components of the latter network.

Radio program distribution services presently contemplated would be installed as program applications in data processing units in the IP network. These units are either existing units, that are capable of accommodating installation and activation of such programs without obstruction of other processes currently being performed by respective units, or they are units newly integrated into the IP network, by means of conventional network processes that allow for such integration without undue obstruction of communication activities currently in process in that network. Existing network operating systems, such as Windows NT, are effectively organized to allow for such "seamless" integration.

Figure 2:
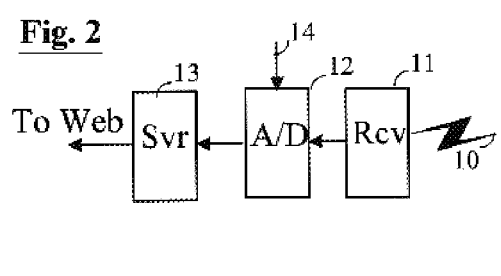
FIG. 2 is a block diagram illustrating how Internet-based radio distributors are linked to the PSTN for providing presently contemplated services.
Figure 3:
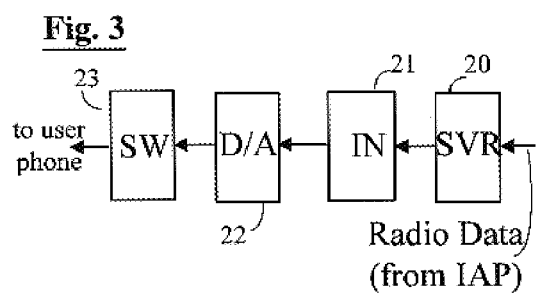
FIG. 3 is a block diagram illustrating how the PSTN is organized for providing such services.

Schematic block diagrams in FIGS. 1–3 are used to further explain the problem described above and the solution presently contemplated. Radio broadcast station 1, at an arbitrary global location but having a unique identification (e.g. call letters) at that location, broadcasts a radio signal in all directions over a limited geographic range. That signal, which ordinarily is available for reception only by standard radio receivers within station's range, is received by equipment 2, converted to a form suited to Internet handling and routed over the Internet 3 in that form to equipment 4 operated by the PSTN. The same signal may be sent to not-shown IAP servers and via those servers to existing users of the Internet. Under conditions described below, equipment 4 receives the signal sent by equipment 2, converts it to a form in which it can be received at voice telephones, and transmits the converted signals over the PSTN 5 to such telephones 6. Telephone 6 can be an ordinary stationary unit, a portable one, or even a cellular phone, and the PSTN is presently considered to include telephone networks linked by wire and cellular networks linked by radio communications.

Network interface elements 2 and 4 are described in the next two sections.

3. Internet Interface (Equipment 2, FIG. 1)

Apparatus 2, at the interface between the Internet and the original radio broadcast transmissions, is shown schematically in FIG. 2. Radio signals received at 10 are converted to baseband form at receiver 11, and to digital form at analog-to-digital (A/D) converter 12. The digital signals are passed to server 13 and made available there for transmission over the Internet. If required, the digital signals are also stored at server 13. Optional input 14 to A/D converter 13 is intended for use where radio station 1 (FIG. 1) has land line directly to equipment 2 and serves as the enterprise providing Internet delivery services for its radio programs.

Signals produced at the interface between server 13 and its connection to the Internet depends upon the type of connection. If access is obtained through a computer modem and telephone link (to an IAP), signals produced at the interface may be in the form commonly produced by the modem. If access is obtained through a broadband link (cable, satellite, special telephone line, etc.) the signals at the interface will be in a form suited to transmission over the respective link.

Techniques disclosed in the above-referenced Malkin et al patent, for multicasting data over data communication networks such as the Internet, are applicable to extension to the PSTN of multicasting functions presently under consideration therein. In such extension, signals representing radio broadcast audio would be multicast over the Internet to a PSTN interface (see next section of this disclosure) and routed from there to PSTN customers requiring concurrent access to the same program.

4. PSTN Interface to Internet

Figure 4:
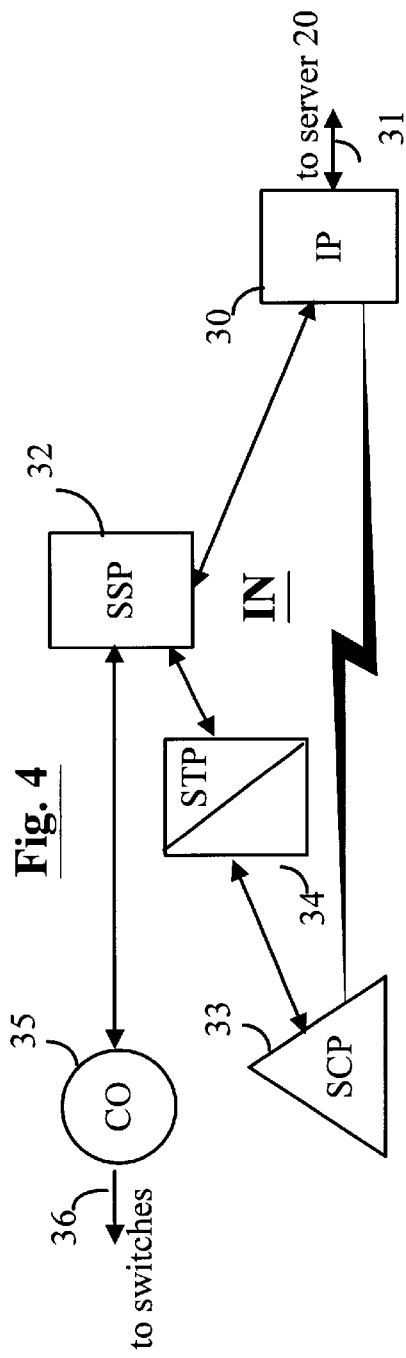
FIG. 4 is a block diagram of an intelligent network in the PSTN representing a component of the system suggested in FIG. 3.

Schematic block diagrams in FIGS. 3 and 4 indicate the organization of apparatus which interfaces the PSTN to the Internet (shown as block 4 in FIG. 1).

Server 20, operated by or for the PSTN, communicates with radio program sources through the Internet, and transfers data representing radio programs to Intelligent Network (IN) 21 in the PSTN when called for by IN 21. That data may be stored in not-shown storage media accessible to server 20, as well as in storage media within IN 21. IN 21 (shown in FIG. 4) preferably includes an Intelligent Peripheral (IP) subsystem of processors organized in accordance with the disclosure in the above-referenced patent application by Acker et al.

As discussed below, one set of processors in this IP subsystem provides services related to telephone and facsimile communications, and another set of processors manages functions ancillary to such services (e.g. billing for fee-based services, etc.). In respect to radio services that are the subject of the present application, these processors receive telephone calls from PSTN users desiring access to the service, interact with each caller to determine an originating radio station and radio program content to be delivered to that caller, and if the radio program requested is not already stored in the IP subsystem the subsystem interacts with an Internet-based enterprise, via server 20, to obtain data containing the requested program. In either situation, signals representing the program audio are sent to the caller's telephone. If that telephone is an analog instrument, these signals are sent through digital-to-analog converter 22 (FIG. 3) and switch complex 23 (FIG. 3), the latter associated with the telephone system exchange locally serving the caller. Converter 22 converts the data to a signal form suitable for presentation to the caller's telephone; e.g. to standard analog form for a conventional analog telephone or digital form for a digital telephone. At the caller's telephone, these signals are reproduced as audio functions (music, speech, etc.) presented in the received radio broadcasts. As noted earlier, speech functions included in such programs can be in a language foreign to the caller's immediate locale.

It should be understood that the PSTN, as presently viewed, includes cellular telephone networks, and that delivery of the radio program content to cellular telephones may involve additional handling and transformation of the radio content signals; for instance, the signals may be transferred to the cellular network in digital form and then converted within that network to an analog or digital form compatible with the caller's equipment.

IN 21—which preferably conforms to advanced intelligent network architecture (AIN) specifications now common to the PSTN—is organized in the manner indicated in FIG. 4. IN 21 contains a sub-network of IP (intelligent peripheral) processors shown at 30. As noted above, IP 30 preferably is organized in the manner taught by Acker et al in their above-referenced patent application; i.e. it includes plural subsets of processors with different functional responsibilities, whereby services provided to PSTN users are implemented separately from functions associated with other operations of the PSTN. This allows for expansion of an IP subsystem to handle additional service-related functions without disrupting existing processes of the PSTN.

As seen in FIG. 4, IP 30 communicates at one interface 31 with server 20, and at other interfaces with Signal Switch Point (SSP)complex 32 and Service Control Point (SCP) complex 33. Complexes SSP and SCP inter-communicate via Signal Transfer Point (STP) complex 34, the latter also communicating with central office exchanges (CO) 35 having links 36 supervising connections to end-user telephones.

Operations of SSP, SCP, and STP are well-documented in published architecture specifications issued by PSTN carriers. Furthermore, apart from functions and organizational structures disclosed in the Acker et al patent application, organizations of IP processor complexes are also well documented in published literature and well understood by those skilled in the telephone communication arts.

5. Operations For Delivery of Present Radio Content Services

Figure 5:
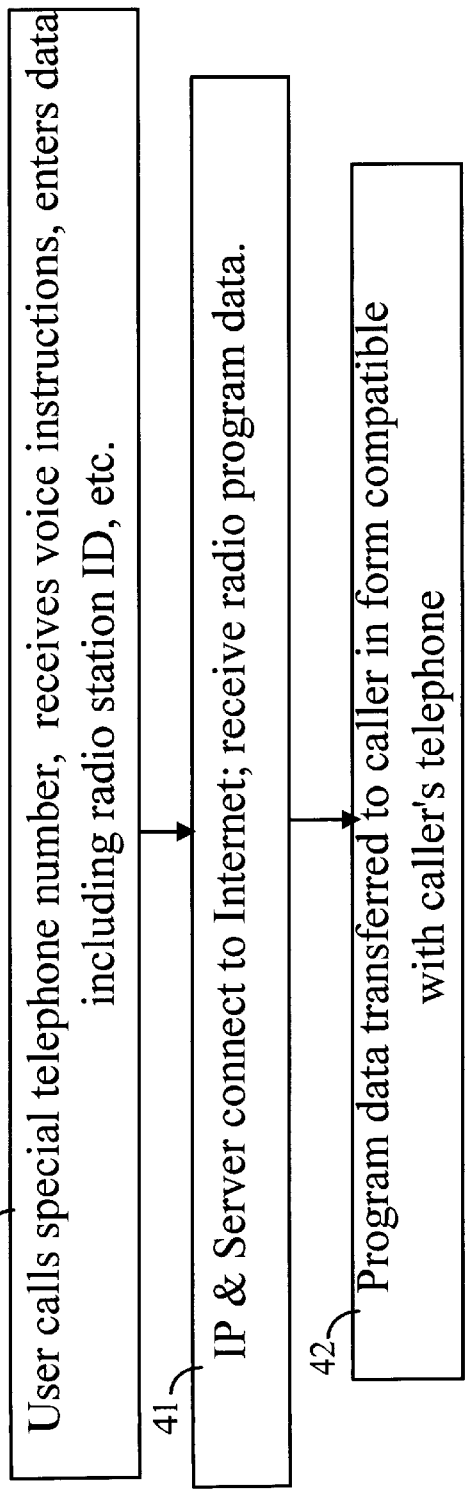
FIG. 5 is a flowchart for explaining on a very general level how the PSTN provides the present radio service.

Flowcharts in FIGS. 5, 6b, and 7b illustrate how the subject radio program relaying services are provided to PSTN users. FIG. 5 provides a broad overview of these operations. FIG. 6b illustrates how these services are handled within the PSTN and FIG. 7b indicates how they are handled in the Internet. Schematics in FIGS. 6a and 7a respectively indicate organizations of networks performing the functions shown in FIGS. 6b and 7b.

The process for providing the present service is indicated generally in FIG. 5. The user calls/dials a special number and is prompted by voice instructions to identify the radio program which that caller wants to hear (operation 40). The IP and web server then operate to acquire the program via the Internet (operations 41) and transmit corresponding signals to the caller's telephone (operations 42). The corresponding signals are transferred in a form compatible with the caller's telephone; e.g. a standard analog form if the caller is using a standard analog set on a non-cellular network, a standard digital form if the caller is using a standard digital set on a non-cellular network, or an appropriate form if the caller is using either an analog or digital cellular phone.

When the transfer is either completed or terminated by the caller (e.g. by hanging up the phone), data relevant to billing for the transfer is sent to an IP processor responsible for overseeing billing processes.

The PSTN network performing these processes is shown in FIG. 6a and details of the processes are indicated in FIG. 6b.

As seen in FIG. 6a, the network interfacing the PSTN 50 to the Internet 51, which performs services shown in FIG. 6b, includes IP subsystem 52, gateway (GW) 53, gatekeeper (GK) 54, and web server 55. IP 52 includes call processors (CP's) 52a and voice processors (VP's) 52b. VP's handle telephone service applications and CP's administer other PSTN functions including management of service billing functions. Web server 55 establishes links between GW 53 and Internet sites (URL's). GW 53 communicates with linked sites and administers functions pertinent to such, including functions necessary for security. GK 54 interfaces between GW 53 and web server 55.

GW 53 performs streaming of audio data, as described in the above-referenced patent to Creamer et al, over both the Internet and the PSTN. The streaming process is effective to deliver radio broadcast audio in real time to PSTN customers of the presently considered service. GW 53 and GK 54 follow presently well known procedures (refer e.g. to ITUT standard H323) for exchanging such data at their interface.

With respect to presently contemplated radio program transfer services, operations performed by the foregoing elements 52–55 are indicated in FIG. 6*b*.

When a user of the service calls a special number assigned to the service, the call is intercepted by a VP 52*b*. The VP interacts with the caller to ascertain that the caller is an authorized user of the service (operations 60). Such interaction may be via synthetic voice announcements issued by the VP and either spoken or tone key responses by the caller which are interpreted by the VP. Interpretation of spoken responses is effected by well known speaker-independent voice recognition processes.

When the call has been authenticated, the caller is prompted (operation 61) for a request identifying the radio program and its source. If the program has been pre-recorded, the source identification will indicate that; whereas if the program is one emanating in real time from a remote radio broadcasting station the source identification will identify the remote station.

The VP will confirm the request (operation 62) and initiate processes (63–68) for responding to the request. These processes include processes for accounting for delivery of the requested service and processes for acquiring radio program content and transferring corresponding signals to the caller.

Two types of accounting processes are contemplated presently; one in which the caller is billed directly for the service, and another in which an advertisement is presented to the caller in advance of the radio program content and the commercial entity sponsoring the advertisement is billed (see operation 63). For directly billed services, callers may be assigned one or more special 900 numbers associated with that type of billing, and for services supported by advertisements callers may be assigned special 800 numbers associated with billing of sponsors.

To deliver the requested radio program to a caller first requesting that program, the IP system connects to the program source via the Internet, receives and records the program, and concurrently transfers the program to the caller (operations 64–66). To deliver a previously recorded program to a caller requesting such the IP system locates the recording and initiates a transmittal of it to the caller. In this process, the IP preferably employs multi-casting techniques taught in the previously referenced Malkin et al patent so as to allow for time-overlapped delivery of the same material to multiple callers.

The delivery process continues until the caller hangs up (operation 67), which can occur either before or after the entire program has been delivered, and at its conclusion appropriate accounting actions are initiated (operation 68). IN (FIG. 4) to an IP (FIG. 4). A caller failing to hang up after completion of program delivery may be disconnected by explicit action initiated by a VP.

6. Other Relevant Considerations

Functions described heretofore as relevant to the present invention can be realized in hardware, software or combinations thereof. Functions realized in software may be applied to PSTN server and IP systems referenced above in the form of discrete computer system programs which, when installed in present systems, effectuate respective functions. Computer system programs in the present context are expressions in any language, code or notation of sets of instructions useful to cause systems in which they are installed to perform the specific functions presently contemplated. Such computer system programs may be stored in a variety of storage media and delivered in various forms, including transmission over data communication networks.

I claim:

1. Apparatus for enabling a telephone service provider operating within the public switched telephone network (PSTN) to provide a radio program distribution service to users of their services, wherein radio programs included in said service originate as conventional broadcast radio transmissions over limited geographic ranges, and wherein users of said program distribution service are capable of audibly receiving said programs using only presently conventional telephone instruments located outside of said limited geographic ranges, without requiring said users to sustain and potentially be charged for long-distance telephone circuit connections within said PSTN and without requiring said users to connect directly to any public data transmission network external to said PSTN; said apparatus comprising:

a data server operating exclusively within said PSTN for linking said telephone service provider to a radio program broadcast distribution facility operating through a global public data communication network external to said PSTN; said data communication network connecting directly to receivers of limited range radio broadcast transmissions, and delivering digital data signals corresponding to radio programs received at said receivers both to said data server, and to other users of said data communication network, in a digital form; and an intelligent network operating within said PSTN for linking selectively between customers of said telephone service provider and said data server so as to deliver radio programs handled by said data server to customers who are subscribed to said radio program distribution service, said delivered programs being transmitted to said subscribed customers in signal forms receivable by any telephone instruments currently being used by said subscribed customers; said intelligent network including an Intelligent Peripheral (IP) sub-network performing processes required to transmit said signals representing said radio programs to said subscribed customers in said receivable signal forms, as well as processes ancillary to the radio service associated with delivery of said radio programs to said subscribed customers.

2. Apparatus in accordance with claim 1 wherein said IP sub-system is adapted for maintaining stored profiles of radio broadcast stations accessible through said global data communication network, and of radio programs scheduled for distribution by said stations.

3. Apparatus in accordance with claim 1 wherein said global data communication network is the Internet, and said data server connects to said Internet to obtain access to radio programs originating as limited-range broadcasts, received at sites remote from end users of said service, and distributed via said Internet both to said server and to direct end-users of said Internet, said direct end-users connecting to said Internet through data communication equipment different from said conventional telephone instruments.

4. Apparatus according to claim 3 wherein said ancillary processes include billing processes associated with deriving revenues for both said service provider and said IAP's based on delivery of radio programs to PSTN users subscribing to said service.

5. Apparatus according to claim 4 wherein said revenues are derived at least in part from inclusion of advertisements in said distributed programs and said billing processes include processes for billing sponsors of said advertisements.

6. Computer system software, deliverable via computer-readable media to a computer system within the public switched telephone network (PSTN), comprising:

means effective to interface said PSTN to a data communication network external to said PSTN, for transferring digital signals from said data communication network to said PSTN, said digital signals representing audio functions of a radio program originating as a limited-range wireless broadcast received by said data communication network at a site remote from its interface to said PSTN; and means cooperative with said interface means for delivering corresponding signals representing said audio functions to a user of said PSTN subscribing to a special telephone system service associated with delivery of said corresponding signals; wherein said subscribing user is one using only any conventional telephone instrument incapable of directly linking to said data communication network, said corresponding signals are transmitted to said user in a form compatible with reception requirements of said conventional telephone instrument, and delivery of said corresponding signals is accomplished without need for any long-distance telephone circuit connection between said subscribed user and said remote site of reception of said limited range broadcast.

7. A telephone network system for providing a worldwide radio program distribution service at low cost to users of a telephone network, via conventional telephone instruments, said system comprising:

an intelligent network entity (IN) within said telephone network for linking said telephone network to the Internet data communication network; said IN interacting with said Internet to receive radio programs in digital signal forms, said programs originating as range-limited wireless radio broadcasts, said broadcasts received at Internet sites remote from said IN and within range of transmitters sending said broadcasts; said radio programs being available within said Internet for distribution in said digital signal forms both to said IN and to direct end-users of said Internet;

said IN including means for transmitting said received radio programs, to end-users of said telephone network employing conventional telephone instruments, in signal forms suitable for reception at respective conventional instruments;

said transmitting means serving to transmit said programs directly to telephone system exchanges local to respective said end-users thereby avoiding need to create dedicated long-distance telephone circuit connections between individual end-users and sites of reception of said broadcasts, and consequently avoiding the need to charge said end-users specifically for such connections.

8. The system of claim 7 wherein said IN is adapted to be able to transmit a single radio program concurrently to plural end-users of said telephone network.

9. The system of claim 7 wherein said IN includes a data server linking said IN to said Internet.

10. The system of claim 7 wherein said IN is adapted for inserting, into a said radio program being distributed to a said end-user of said telephone network, advertisements of local commercial interest to said user; whereby the cost to said user of receiving said program can be reduced at least in part by fees charged to sponsors of said advertisements.

\* \* \* \* \*